(12) United States Patent
Mo

(10) Patent No.: US 11,390,193 B2
(45) Date of Patent: Jul. 19, 2022

(54) TOP ROD ADJUSTING MECHANISM AND CHILD SAFETY SEAT THEREWITH

(71) Applicant: Bambino Prezioso Switzerland AG, Steinhausen (CH)

(72) Inventor: Xiaolong Mo, Guangdong (CN)

(73) Assignee: Bambino Prezioso Switzerland AG, Steinhausen (CH)

( * ) Notice: Subject to any disclaimer, the term of this patent is extended or adjusted under 35 U.S.C. 154(b) by 0 days.

(21) Appl. No.: 17/343,731

(22) Filed: Jun. 10, 2021

(65) Prior Publication Data
US 2021/0394652 A1 Dec. 23, 2021

(30) Foreign Application Priority Data

Jun. 19, 2020 (CN) .......................... 202010565761.7

(51) Int. Cl.
 *B60N 2/28* (2006.01)
(52) U.S. Cl.
 CPC ......... *B60N 2/2824* (2013.01); *B60N 2/2875* (2013.01)
(58) Field of Classification Search
 CPC ............................ B60N 2/2875; B60N 2/2824
 See application file for complete search history.

(56) References Cited

U.S. PATENT DOCUMENTS

| 5,286,085 | A | * | 2/1994 | Minami | B60N 2/2821 |
| | | | | | 297/250.1 |
| 5,810,436 | A | * | 9/1998 | Surot | B60N 2/2821 |
| | | | | | 297/256.13 |
| 6,705,676 | B1 | * | 3/2004 | Berringer | B60N 2/1839 |
| | | | | | 297/250.1 |
| 7,887,128 | B2 | * | 2/2011 | Zink | B60N 2/2824 |
| | | | | | 297/256.13 |

FOREIGN PATENT DOCUMENTS

| CN | 102991380 A | 3/2013 |
| DE | 103 29 921 B4 | 9/2005 |
| DE | 601 21 282 T2 | 7/2007 |
| EP | 1 344 679 A2 | 9/2003 |
| TW | 201601951 A | 1/2016 |
| TW | M535661 U | 1/2017 |
| WO | 95/26279 A1 | 10/1995 |
| WO | 2020/015598 A1 | 1/2020 |

* cited by examiner

*Primary Examiner* — Milton Nelson, Jr.
(74) *Attorney, Agent, or Firm* — Winston Hsu

(57) ABSTRACT

A top rod adjusting mechanism is disposed between a base and a top rod of a child safety seat. The top rod adjusting mechanism includes a transverse frame, a threaded rod and a nut. The transverse frame is movably disposed on the base and installed on the top rod. The threaded rod rotatably passes through one of the transverse frame and the base in axial limitation. The nut is installed on the other of the transverse frame and the base and threadedly sleeved on the threaded rod. When the threaded rod and the nut rotate relative to each other to generate relative sliding movement, the transverse frame drives the top rod to move relative to the base. The top rod adjusting mechanism has advantages of simple structure and easy operation.

17 Claims, 8 Drawing Sheets

TOP ROD ADJUSTING MECHANISM AND CHILD SAFETY SEAT THEREWITH

BACKGROUND OF THE INVENTION

1. Field of the Invention

The present invention relates to a top rod adjusting mechanism and a child safety seat therewith, and more particularly, to a top rod adjusting mechanism and a child safety seat capable of adjusting a top rod relative to a base and with simple structure and convenient operation.

2. Description of the Prior Art

A child safety seat is a device installed on a car seat and uses a restraint device to restrain children on it. It can effectively reduce probability of children being injured in an emergency braking or accidental collision of a vehicle. A conventional child safety seat includes a base, a seat body detachably assembled on the base, and a top rod fixed on the base. Generally, the top rod is fixedly connected with the base, so that the top rod cannot be adjusted relative to the base and the position of the top rod cannot be adjusted flexibly according to actual needs. Although there are also child safety seats in the market with the top rod capable of being adjusted relative to the base, it has complicated structure and adjusting operation. Therefore, it is necessary to provide a mechanism to adjust the top rod relative to the base with simple structure and convenient operation for overcoming the above-mentioned problems.

SUMMARY OF THE INVENTION

Therefore, an objective of the present invention is to provide a top rod adjusting mechanism and a child safety seat capable of adjusting a top rod relative to a base and with simple structure and convenient operation, for solving the aforementioned problems.

In order to achieve the aforementioned objective, the present invention discloses a top rod adjusting mechanism disposed between a base and a top rod of a child safety seat. The top rod adjusting mechanism includes a transverse frame movably disposed on the base and installed on the top rod, a threaded rod rotatably passing through one of the transverse frame and the base in axial limitation, and a nut installed on the other of the transverse frame and the base and threadedly sleeved on the threaded rod. The transverse frame drives the top rod to move relative to the base when the threaded rod and the nut rotate relative to each other to generate relative sliding movement.

Preferably, the top rod adjusting mechanism further includes a rotary operating component installed on the threaded rod, and the nut is not stopped by the rotary operating component when the threaded rod and the nut rotate relative to each other to generate the relative sliding movement.

Preferably, the transverse frame is disposed on the base in a left and right direction, the threaded rod is inclined relative to the base in a front and back direction, and the rotary operating component is disposed in back of the transverse frame.

Preferably, the threaded rod includes a threaded section, an axial stopping structure and a penetrating section arranged along an axial direction of the threaded rod, the penetrating section penetrates through the transverse frame and is connected to the rotary operating component, the axial stopping structure and the rotary operating component cooperatively stop the threaded rod from moving relative to the transverse frame along the axial direction of the threaded rod, and the nut is fixed on the base and sleeved on the threaded section.

Preferably, the top rod adjusting mechanism further includes a washer sleeved on the penetrating section and abutting against the axial stopping structure, and the washer and the rotary operating component cooperatively stop the threaded rod from moving relative to the transverse frame.

Preferably, a radial dimension of the threaded section is greater than a radial dimension of the penetrating section so as to form the axial stopping structure by an end of the threaded section adjacent to the penetrating section.

Preferably, the threaded rod further includes a middle section disposed between the threaded section and the penetrating section, and a radial dimension of the middle section is greater than a radial dimension of the penetrating section so as to form the axial stopping structure by an end of the middle section adjacent to the penetrating section.

Preferably, the threaded rod includes a threaded section, an axial stopping structure and a penetrating section arranged along an axial direction of the threaded rod, the penetrating section penetrates through the base and is connected to the rotary operating component, the nut is fixed on the transverse frame and sleeved on the threaded section, and the axial stopping structure is disposed in the base and stops the threaded rod from moving relative to the base.

Preferably, an end of the transverse frame is fixedly connected to the top rod, and another end of the transverse frame is fixedly connected to the nut.

Preferably, the transverse frame is divided into a left transverse frame portion and a right transverse frame portion by the nut.

Preferably, the left transverse frame portion and the right transverse frame portion are aligned with each other.

Preferably, the rotary operating component is a rotary button.

Preferably, the transverse frame is a hollow tube or a solid rod.

In order to achieve the aforementioned objective, the present invention further discloses a child safety seat including a base, a top rod, a seat body installed on the base, and a top rod adjusting mechanism disposed between the base and the top rod. The top rod adjusting mechanism includes a transverse frame movably disposed on the base and installed on the top rod, a threaded rod rotatably passing through one of the transverse frame and the base in axial limitation, and a nut installed on the other of the transverse frame and the base and threadedly sleeved on the threaded rod. The transverse frame drives the top rod to move relative to the base when the threaded rod and the nut rotate relative to each other to generate relative sliding movement Preferably, the seat body is detachably installed on the base.

Preferably, a guiding slot is formed on the base for allowing the transverse frame to pass through and slide forward and backward.

Preferably, a guiding direction of the guiding slot is inclined along a front and back direction of the base.

In summary, the top rod adjusting mechanism of the present application includes the transverse frame, the threaded rod and the nut. The transverse frame is movably disposed on the base and installed on the top rod, so that the top rod can move relative to the base with the transverse frame. Furthermore, the threaded rod rotatably passes through one of the transverse frame and the base in axial limitation. The nut is installed on the other of the transverse frame and the base and threadedly sleeved on the threaded rod. When the threaded rod and the nut rotate relative to each other to generate relative sliding movement, the transverse frame drives the top rod to move relative to the base for position adjustment of the top rod. Thus, the top rod adjusting mechanism of the present application can adjust the position of the top rod relative to the base and has advantages of simple structure and convenient operation.

These and other objectives of the present invention will no doubt become obvious to those of ordinary skill in the art after reading the following detailed description of the preferred embodiment that is illustrated in the various figures and drawings.

DETAILED DESCRIPTION

In order to illustrate technical specifications and structural features as well as achieved purposes and effects of the present invention, relevant embodiments and figures are described as follows.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
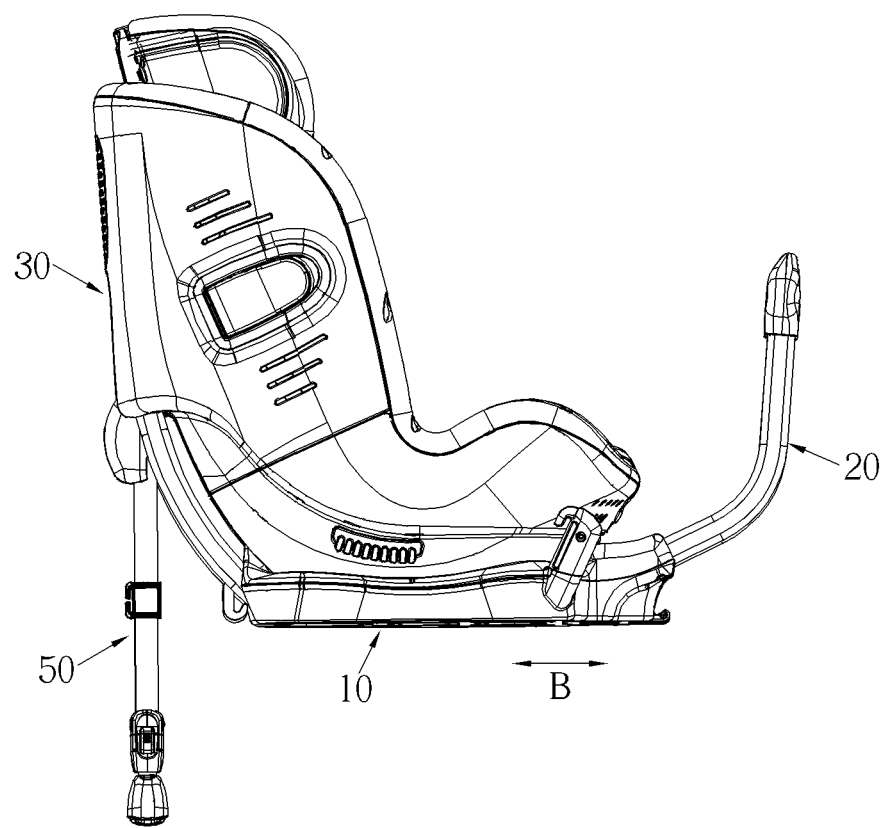
FIG. 1 is a schematic drawing of a child safety seat in a rearward-facing orientation according to a first embodiment of the present application.
Figure 2:
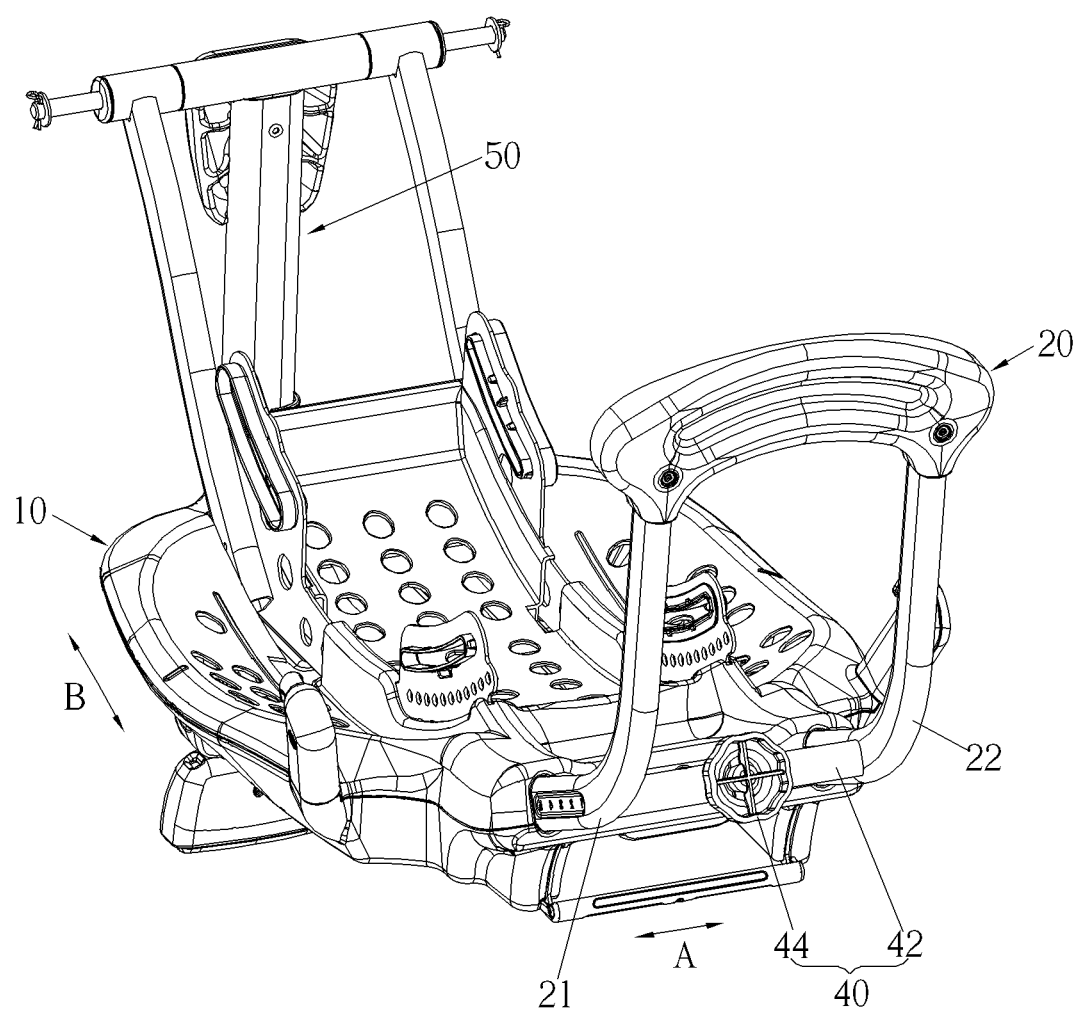
FIG. 2 is a diagram of the child safety seat as shown in FIG. 1 without illustrating a seat body and a partial base according to the first embodiment of the present application.
Figure 3:
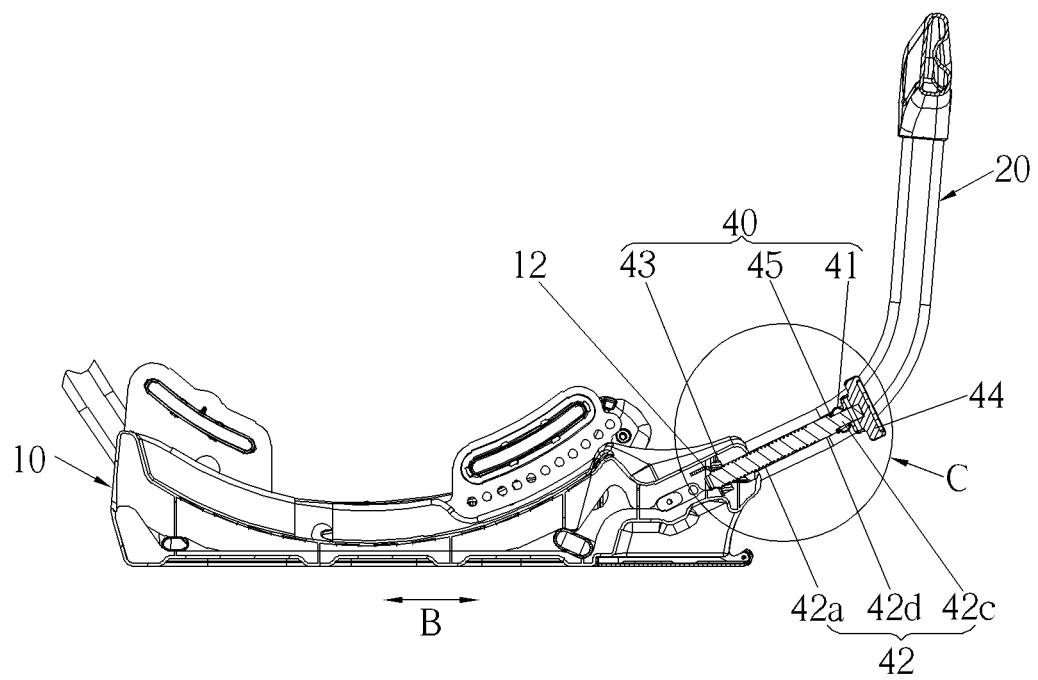
FIG. 3 is an internal structural diagram of the child safety seat as shown in FIG. 2 according to the first embodiment of the present application.
Figure 4:
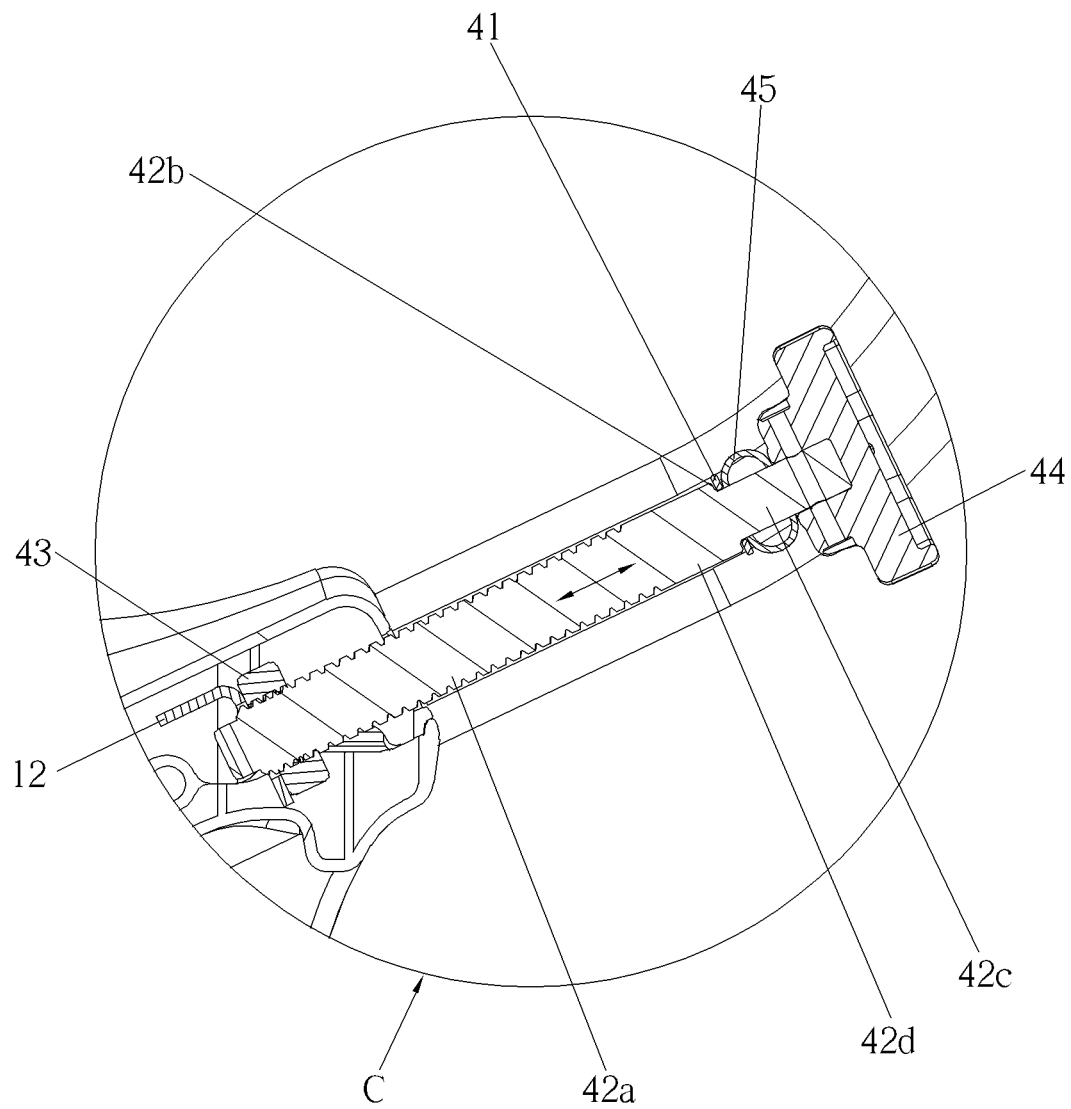
FIG. 4 is an enlarged diagram of a C portion of the child safety seat as shown in FIG. 3 according to the first embodiment of the present application.

Please refer to FIG. 1 to FIG. 4. FIG. 1 is a schematic drawing of a child safety seat 100 in a rearward-facing orientation according to a first embodiment of the present application. FIG. 2 is a diagram of the child safety seat 100 as shown in FIG. 1 without illustrating a seat body 30 and a partial base 10 according to the first embodiment of the present application. FIG. 3 is an internal structural diagram of the child safety seat 100 as shown in FIG. 2 according to the first embodiment of the present application. FIG. 4 is an enlarged diagram of a C portion of the child safety seat 100 as shown in FIG. 3 according to the first embodiment of the present application. The child safety seat 100 includes the base 10, a top rod 20, the seat body 30 installed on the base 10, and a top rod adjusting mechanism 40 disposed between the base 10 and the top rod 20. The top rod adjusting mechanism 40 includes a transverse frame 41 movably disposed on the base 10 and installed on the top rod 20. The top rod 20 is assembled with the transverse frame 41 so that the transverse frame 41 and the top rod 20 can be adjusted together. Preferably, the seat body 30 can be detachably installed on the base 10 so as to facilitate assembly and disassembly of the seat body 30 and the base 10 and switching operation of the seat body 30 relative to the base 10 between a forward-facing orientation and the rearward-facing orientation as shown in FIG. 1. For enhancing installation stability of the base 10 in a vehicle, the child safety seat 100 further includes a supporting leg device 50. An upper end of the supporting leg device 50 is fixedly connected to a front end of the base 10, and a lower end of the supporting leg device 50 contacts against a floor of the vehicle vertically. Detailed description of the base 10, the top rod 20, the seat body 30 and the supporting leg device 50 are omitted herein. The top rod 20 is located in back of the base 10, and the supporting leg device 50 is located in front of the base 10.

The top rod adjusting mechanism 40 further includes a threaded rod 42 and a nut 43. Preferably, the transverse frame 41 is transversely disposed on the base 10 in a left and right direction (double arrow direction A), and the transverse frame 41 can have an inclined sliding movement in a front and back direction relative to the base 10, so as to raise or lower the top rod 20 relative to the base 10 during the sliding movement of the transverse frame 41. The threaded rod 42 rotatably passes through the transverse frame 41 in axial limitation, so that the threaded rod 42 only can rotate relative to the transverse frame 41 and cannot slide along an axial direction of the threaded rod 42 (double arrow direction inside the threaded rod 42 as shown in FIG. 4) relative to the transverse frame 41. Preferably, the threaded rod 42 is inclined relative to the base 40 in the front and back direction, so that the threaded rod 42 has a backward upper end and a forward lower end. The nut 43 is installed in the base 10. Preferably, the nut 43 can be fastened on a fastener 12 in the base 10, so as to fix the nut 43 with the base 10. The fastener 12 can be, but is not limited thereto, a plated structure. The nut 43 can be an immobile component, and the threaded rod 42 can be a movable component, but is not limited thereto. The nut 43 is threadedly sleeved on the threaded rod 42, so that the threaded rod 42 can rotate relative to the nut 43 to generate relative sliding movement between the threaded rod 42 and the nut 43 during the rotation of the threaded rod 42. The transverse frame 41 can drive the top rod 20 to move relative to the base 10 for position adjustment of the top rod 20 when the threaded rod 42 and the nut 43 rotate relative to each other to generate the relative sliding movement. Specifically, for enhancing operating convenience of rotation of the threaded rod 42, the top rod adjusting mechanism 40 further includes a rotary operating component 44 installed on the threaded rod 42. The rotary operating component 44 cannot interfere with the sliding movement of the threaded rod 42 relative to the nut 43, so that the nut 43 is not stopped by the rotary operating component 44 when the threaded rod 42 and the nut 43 rotate relative to each other to generate the relative sliding movement. Preferably, the rotary operating component 44 is located in back of the transverse frame 41, as shown in FIG. 2 and FIG. 4. The rotary operating component 44 can be a rotary button so as to simplify structure of the rotary operating component 44, but is not limited thereto.

As shown in FIG. 3 and FIG. 4, the threaded rod 42 includes a threaded section 42a, an axial stopping structure 42b and a penetrating section 42c arranged along the axial direction of the threaded rod 42 (double arrow direction inside the threaded rod 42 as shown in FIG. 4). The penetrating section 42c penetrates through the transverse frame 41 and is connected to the rotary operating component 44. Preferably, the rotary operating component 44 can be sleeved on the penetrating section 42c, and then the rotary operating component 44 and the penetrating section 42c can be fastened together by a fastening component, such as a pin or a screw, so as to facilitate assembly of the rotary operating component 44 and the penetrating section 42c. The axial stopping structure 42b and the rotary operating component 44 cooperatively stop the threaded rod 42 from moving relative to the transverse frame 41 along the axial direction of the threaded rod 42. That is, the axial limitation of the threaded rod 42 can be achieved by cooperation of the rotary operating component 44 and the axial stopping structure 42b, so that the threaded rod 42 only can rotate relative to the transverse frame 41 and cannot slide along the axial direction of the threaded rod 42 relative to the transverse frame 41. The nut 43 is fixed on the base 10 and sleeved on the threaded section 42a of the threaded rod 42.

Specifically, as shown in FIG. 3 and FIG. 4, for reducing friction between the transverse frame 41 and the axial stopping structure 42b of the threaded rod 42 so as to facilitate rotation of the threaded rod 42, the top rod adjusting mechanism 40 further includes a washer 45 sleeved on the penetrating section 42c and abutting against the axial stopping structure 42b, and the washer 45 and the rotary operating component 44 can cooperatively stop the threaded rod 42 from moving relative to the transverse frame 41. Specifically, the threaded rod 42 further includes a middle section 42d disposed between the threaded section 42a and the penetrating section 42c, and a radial dimension of the middle section 42d is greater than a radial dimension of the penetrating section 42c so as to form the axial stopping structure 42b by an end of the middle section 42d adjacent to the penetrating section 42c. Understandably, when the middle section is not provided, a radial dimension of the threaded section 42a can be designed to be greater than the radial dimension of the penetrating section 42c, so as to form the axial stopping structure 42b by an end of the threaded section 42a adjacent to the penetrating section 42c. Besides, when the washer 45 is not provided, the axial stopping structure 42b and the rotary operating component 44 can cooperatively stop the threaded rod 42 from moving relative to the transverse frame 41.

As shown in FIG. 2 and FIG. 4, the transverse frame 41 can be a hollow tube to reduce the total weight under enough structural strength. Alternatively, the transverse frame 41 can be a solid rod. When the transverse frame 41 is transversely disposed on the base 10 in the left and right direction and the top rod 20 is formed in a U shape, a left end of the transverse frame 41 is connected to a left leg portion 21 of the top rod 20, and a right end of the transverse frame 41 is connected to a right leg portion 22 of the top rod 20.

Figure 5:
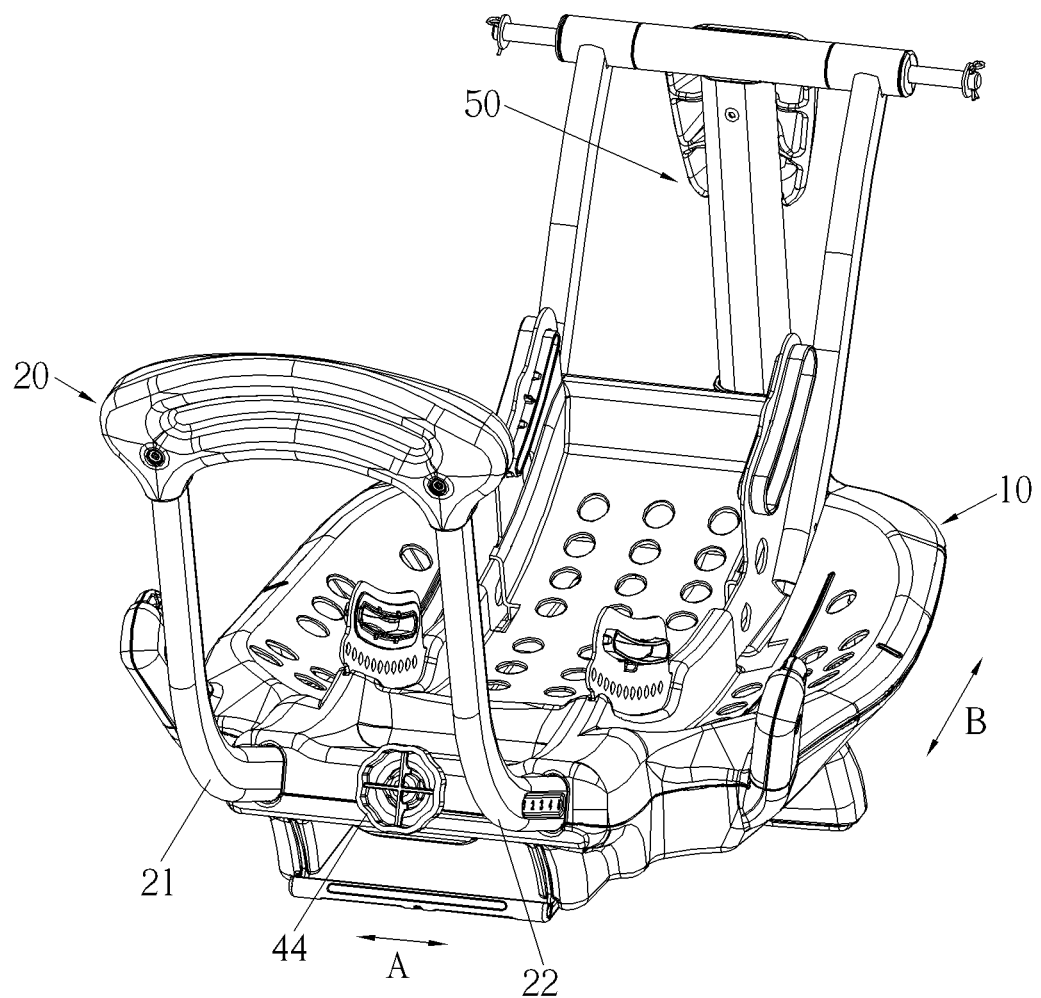
FIG. 5 is a diagram of a top rod adjusting mechanism disposed between a base and a top rod of the child safety seat according to a second embodiment of the present application.
Figure 6:
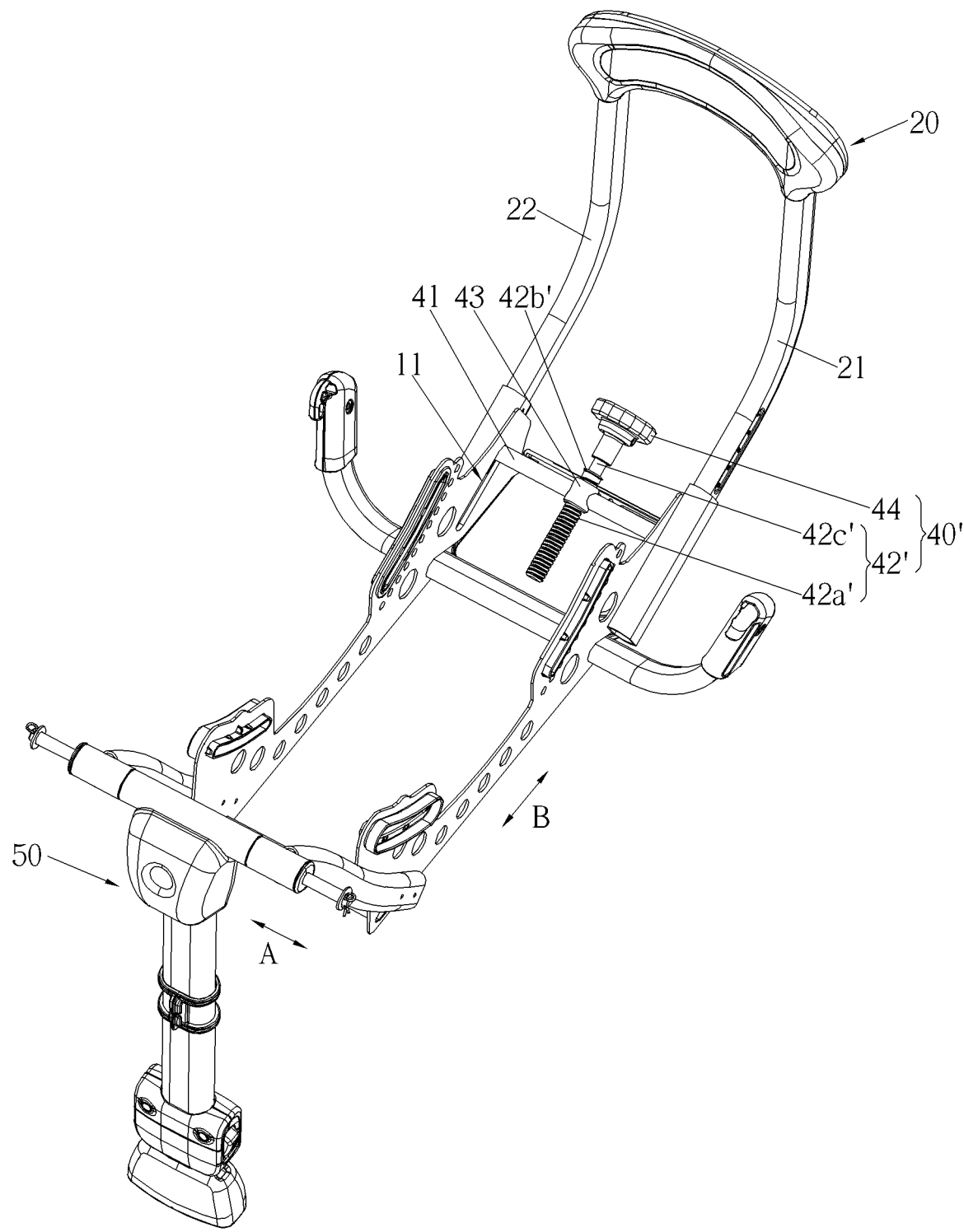
FIG. 6 is a diagram of the child safety seat as shown in FIG. 5 without illustrating the partial base according to the second embodiment of the present application.
Figure 7:
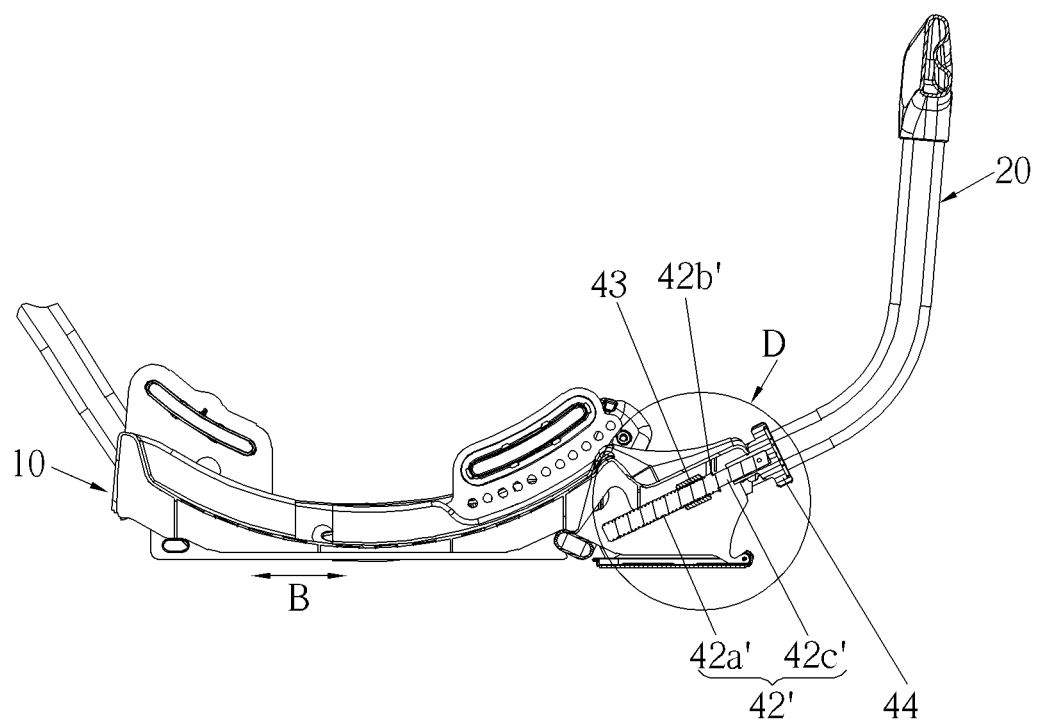
FIG. 7 is an internal structural diagram of the child safety seat as shown in FIG. 6 according to the second embodiment of the present application.
Figure 8:
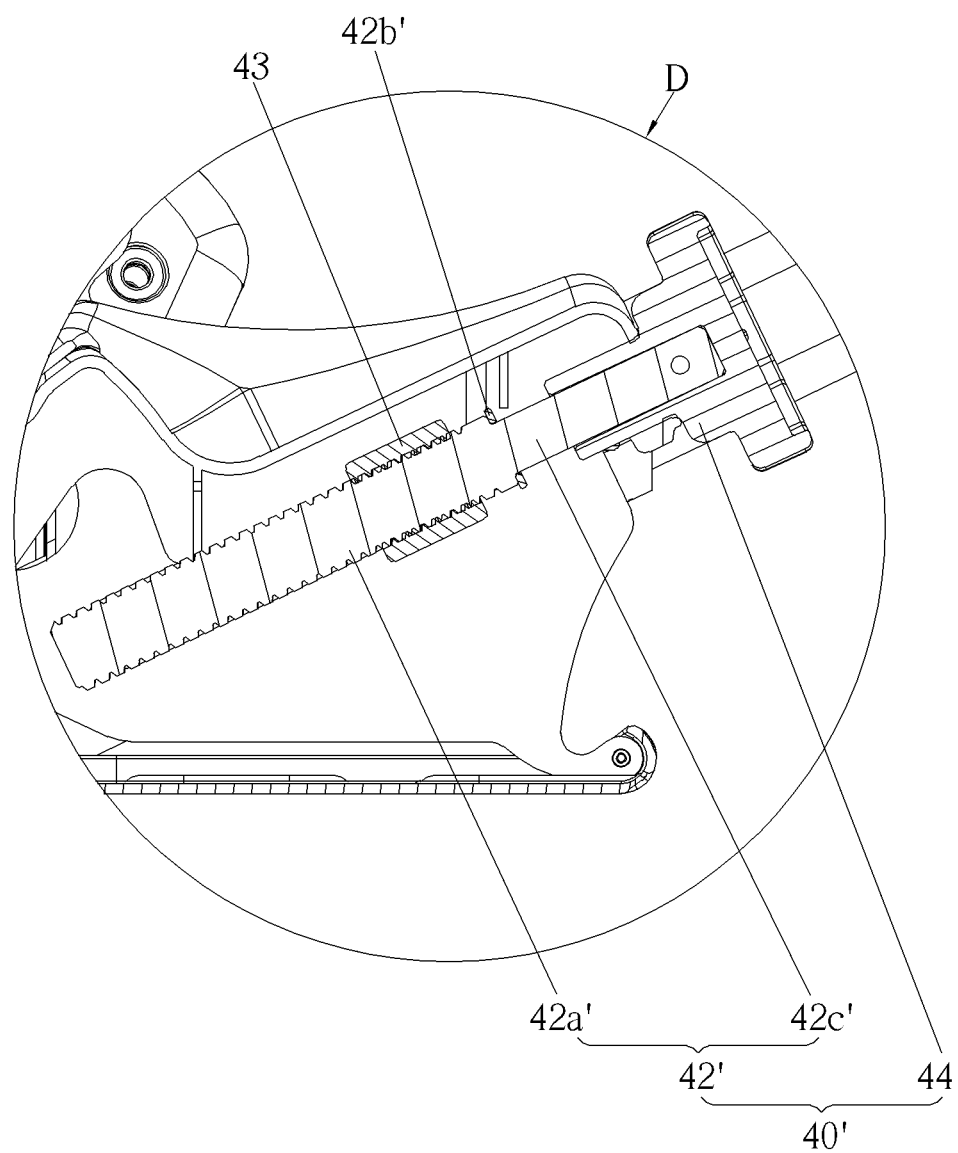
FIG. 8 is an enlarged diagram of a D portion of the child safety seat as shown in FIG. 7 according to the second embodiment of the present application.

Please refer to FIG. 5 to FIG. 8. FIG. 5 is a diagram of a top rod adjusting mechanism 40' disposed between the base 10 and the top rod 20 of the child safety seat 100 according to a second embodiment of the present application. FIG. 6 is a diagram of the child safety seat 100 as shown in FIG. 5 without illustrating the partial base 10 according to the second embodiment of the present application. FIG. 7 is an internal structural diagram of the child safety seat 100 as shown in FIG. 6 according to the second embodiment of the present application. FIG. 8 is an enlarged diagram of a D portion of the child safety seat 100 as shown in FIG. 7 according to the second embodiment of the present application. The structure of the child safety seat 100 of the second embodiment is similar to the one of the first embodiment, and main differences between the embodiments are described as follows.

In the second embodiment, the top rod adjusting mechanism 40' includes a threaded rod 42', and the nut 43 is installed on the transverse frame 41, so as to fix the nut 43 with the transverse frame 41. The threaded rod 42' rotatably passes through the base 10 in axial limitation, so that the threaded rod 42' only can rotate relative to the base 10 and cannot slide along an axial direction of the threaded rod 42' relative to the base 10. The nut 43 can rotate relative to the threaded rod 42' to slide along the axial direction of the threaded rod 42' relative to the threaded rod 42' during the rotation of the threaded rod 42'. The transverse frame 41 can drive the top rod 20 to move relative to the base 10 for position adjustment of the top rod 20 by the sliding movement of the nut 43.

However, in the first embodiment, as shown in FIG. 3 and FIG. 4, the nut 43 is installed in the base 10 and cannot move relative to the base 10. The threaded rod 42 rotatably passes through the transverse frame 41 in axial limitation, so that the threaded rod 42 only can rotate relative to the transverse frame 41 and cannot slide along the axial direction of the threaded rod 42 relative to the transverse frame 41, so that the threaded rod 42 can rotate relative to the nut 43 to slide relative to the nut 43 during the rotation of the threaded rod 42. The transverse frame 41 can drive the top rod 20 to move relative to the base 10 for position adjustment of the top rod 20 by the sliding movement of the threaded rod 42.

In the second embodiment, as shown in FIG. 6 to FIG. 8, the threaded rod 42' includes a threaded section 42a', an axial stopping structure 42b' and a penetrating section 42c' arranged along the axial direction of the threaded rod 42'. The penetrating section 42c' penetrates through the base 10 and is connected to the rotary operating component 44. The nut 43 is fixed on the transverse frame 41 and sleeved on the threaded section 42a'. The axial stopping structure 42b' is disposed in the base 10 to stop the threaded rod 42' from moving relative to the base 10. Preferably, the axial stopping structure 42b' can be a circular ring sleeved on the penetrating section 42c' and protrude from the threaded section 42a' and the penetrating section 42c' in a radial direction. The circular ring and the penetrating section 42c' can be integrally formed, such as being welded together.

However, in the first embodiment, as shown in FIG. 3 and FIG. 4, the threaded rod 42 includes the threaded section 42a, the axial stopping structure 42b and the penetrating section 42c arranged along the axial direction of the threaded rod 42. The penetrating section 42c penetrates through the transverse frame 41 and is connected to the rotary operating component 44. The axial stopping structure 42b and the rotary operating component 44 cooperatively stop the threaded rod 42 from moving relative to the transverse frame 41 along the axial direction of the threaded rod 42. The nut 43 is sleeved on the threaded section 42a. The top rod adjusting mechanism 40 further includes the washer 45 sleeved on the penetrating section 42c and abutting against the axial stopping structure 42b, and the washer 45 and the rotary operating component 44 can cooperatively stop the threaded rod 42 from moving relative to the transverse frame 41. Furthermore, the threaded rod 42 further includes the middle section 42d disposed between the threaded section 42a and the penetrating section 42c, and the radial dimension of the middle section 42d is greater than the radial dimension of the penetrating section 42c so as to form the axial stopping structure 42b by the end of the middle section 42d adjacent to the penetrating section 42c.

In the second embodiment, an end of the transverse frame 41 is fixedly connected to the top rod 20, and another end of the transverse frame 41 is fixedly connected to the nut 43. That is, the transverse frame 41 is divided into a left transverse frame portion and a right transverse frame portion by the nut 43, so that the nut 43 is disposed between the left transverse frame portion and the right transverse frame portion. Preferably, the left transverse frame portion and the right transverse frame portion can be aligned with each other, so as to balance force applied on the nut 43 by the threaded rod 42' and make the position adjustment of the top rod 20 smooth and reliable. When the top rod 20 is formed in a U shape, a left end of the left transverse frame portion is connected to the left leg portion 21 of the top rod 20, a right end of the left transverse frame portion is fixedly connected to a left side of the nut 43, a left end of the right transverse frame portion is connected to a right side of the nut 43, and a right end of the right transverse frame portion is connected to the right leg portion 22 of the top rod 20.

However, in the first embodiment, as shown in FIG. 2 and FIG. 3, the left end of the transverse frame 41 is connected to the left leg portion 21 of the top rod 20, and the right end of the transverse frame 41 is connected to the right leg portion 22 of the top rod 20.

In the second embodiment, as shown in FIG. 6, a guiding slot 11 is formed on the base 10 for allowing the transverse frame 41 to pass through and slide forward and backward. Preferably, a guiding direction of the guiding slot 11 can be inclined along a front and back direction of the base 10 (double arrow direction B), so as to enhance smoothness of forward and backward sliding movement of the transverse frame 41. However, in the first embodiment, it does not have the guiding slot.

Except for the above-mentioned differences between the first embodiment and the second embodiment, the second embodiment is basically the same as the first embodiment, so detailed descriptions are omitted herein.

In contrast to the prior art, the top rod adjusting mechanism of the present application includes the transverse frame, the threaded rod and the nut. The transverse frame is movably disposed on the base and installed on the top rod, so that the top rod can move relative to the base with the transverse frame. Furthermore, the threaded rod rotatably passes through one of the transverse frame and the base in axial limitation. The nut is installed on the other of the transverse frame and the base and threadedly sleeved on the threaded rod. When the threaded rod and the nut rotate relative to each other to generate relative sliding movement, the transverse frame drives the top rod to move relative to the base for position adjustment of the top rod. Thus, the top rod adjusting mechanism of the present application can adjust the position of the top rod relative to the base and has advantages of simple structure and convenient operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A top rod adjusting mechanism disposed between a base and a top rod of a child safety seat, the top rod adjusting mechanism comprising:
   a transverse frame movably disposed on the base and installed on the top rod;
   a threaded rod rotatably passing through one of the transverse frame and the base in axial limitation; and
   a nut installed on the other of the transverse frame and the base and threadedly sleeved on the threaded rod, the transverse frame driving the top rod to move relative to the base when the threaded rod and the nut rotate relative to each other to generate relative sliding movement.

2. The top rod adjusting mechanism of claim 1, wherein the transverse frame is a hollow tube or a solid rod.

3. The top rod adjusting mechanism of claim 1, further comprising a rotary operating component installed on the threaded rod, and the nut being not stopped by the rotary operating component when the threaded rod and the nut rotate relative to each other to generate the relative sliding movement.

4. The top rod adjusting mechanism of claim 3, wherein the rotary operating component is a rotary button.

5. The top rod adjusting mechanism of claim 3, wherein the transverse frame is disposed on the base in a left and right direction, the threaded rod is inclined relative to the base in a front and back direction, and the rotary operating component is disposed in back of the transverse frame.

6. The top rod adjusting mechanism of claim 5, wherein the threaded rod comprises a threaded section, an axial stopping structure and a penetrating section arranged along an axial direction of the threaded rod, the penetrating section penetrates through the base and is connected to the rotary operating component, the nut is fixed on the transverse frame and sleeved on the threaded section, and the axial stopping structure is disposed in the base and stops the threaded rod from moving relative to the base.

7. The top rod adjusting mechanism of claim 6, wherein an end of the transverse frame is fixedly connected to the top rod, and another end of the transverse frame is fixedly connected to the nut.

8. The top rod adjusting mechanism of claim 7, wherein the transverse frame is divided into a left transverse frame portion and a right transverse frame portion by the nut.

9. The top rod adjusting mechanism of claim 8, wherein the left transverse frame portion and the right transverse frame portion are aligned with each other.

10. The top rod adjusting mechanism of claim 5, wherein the threaded rod comprises a threaded section, an axial stopping structure and a penetrating section arranged along an axial direction of the threaded rod, the penetrating section penetrates through the transverse frame and is connected to the rotary operating component, the axial stopping structure and the rotary operating component cooperatively stop the threaded rod from moving relative to the transverse frame along the axial direction of the threaded rod, and the nut is fixed on the base and sleeved on the threaded section.

11. The top rod adjusting mechanism of claim 10, further comprising a washer sleeved on the penetrating section and abutting against the axial stopping structure, and the washer and the rotary operating component cooperatively stopping the threaded rod from moving relative to the transverse frame.

12. The top rod adjusting mechanism of claim 10, wherein a radial dimension of the threaded section is greater than a radial dimension of the penetrating section so as to form the axial stopping structure by an end of the threaded section adjacent to the penetrating section.

13. The top rod adjusting mechanism of claim 10, wherein the threaded rod further comprises a middle section disposed between the threaded section and the penetrating section, and a radial dimension of the middle section is greater than a radial dimension of the penetrating section so as to form the axial stopping structure by an end of the middle section adjacent to the penetrating section.

14. A child safety seat comprising:
a base;
a top rod;
a seat body installed on the base; and
a top rod adjusting mechanism disposed between the base and the top rod, the top rod adjusting mechanism comprising:
- a transverse frame movably disposed on the base and installed on the top rod;
- a threaded rod rotatably passing through one of the transverse frame and the base in axial limitation; and
- a nut installed on the other of the transverse frame and the base and threadedly sleeved on the threaded rod, the transverse frame driving the top rod to move relative to the base when the threaded rod and the nut rotate relative to each other to generate relative sliding movement.

15. The child safety seat of claim 14, wherein the seat body is detachably installed on the base.

16. The child safety seat of claim 15, wherein a guiding slot is formed on the base for allowing the transverse frame to pass through and slide forward and backward.

17. The child safety seat of claim 16, wherein a guiding direction of the guiding slot is inclined along a front and back direction of the base.

* * * * *